(12) United States Patent
Wang et al.

(10) Patent No.: US 9,615,197 B2
(45) Date of Patent: Apr. 4, 2017

(54) COMMUNICATION METHOD AND DEVICE (71) Applicant: ANHUI HUAMI INFORMATION TECHNOLOGY CO., LTD., Hefei, Anhui (CN)

(72) Inventors: Hui Wang, Hefei (CN); Wang Huang, Hefei (CN)

(73) Assignee: ANHUI HUAMI INFORMATION TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/799,791

(22) Filed: Jul. 15, 2015

(65) Prior Publication Data
US 2016/0105759 A1 Apr. 14, 2016

(30) Foreign Application Priority Data
Oct. 10, 2014 (CN) .......................... 2014 1 0531198

(51) Int. Cl.
*H04W 4/00* (2009.01)
*H04W 4/02* (2009.01)
*H04W 4/06* (2009.01)

(52) U.S. Cl.
CPC .......... *H04W 4/008* (2013.01); *H04W 4/025* (2013.01); *H04W 4/06* (2013.01)

(58) Field of Classification Search
CPC ....... H04W 4/008; H04W 4/025; H04W 4/06; H04W 8/205
USPC ............................................... 455/41.2, 41.1
See application file for complete search history.

(56) References Cited

U.S. PATENT DOCUMENTS

| | | | | |
|---|---|---|---|---|
| 6,021,362 A * | 2/2000 | Maggard | ............. | G06Q 20/387 235/375 |
| 6,636,151 B2 * | 10/2003 | Busick | ................ | B67D 3/0032 222/146.1 |
| 6,744,698 B2 * | 6/2004 | Koyama | ................ | G04G 19/08 320/132 |

(Continued)

FOREIGN PATENT DOCUMENTS

| | | |
|---|---|---|
| CN | 102478805 A | 5/2012 |
| CN | 103745347 A | 4/2014 |

(Continued)

*Primary Examiner* — Hai V Nguyen
(74) *Attorney, Agent, or Firm* — Young Basile Hanlon & MacFarlane, P.C.

(57) ABSTRACT

A method and device are provided to assist and accomplish a communication between two strange communication terminals without Internet connection. The method includes transmitting a broadcast package via Bluetooth, which comprises identity information of a first communication terminal, obtaining communication information sent by a second communication terminal after receiving the broadcast package, and communicated with the first communication terminal by the second communication terminal via Bluetooth, and assisting in completing a communication between the first communication terminal and the second communication terminal according to the communication information. The two communication terminal still can communicate with each other without Internet connection, and the position accuracy is improved by communicating with Bluetooth.

16 Claims, 4 Drawing Sheets

(56) References Cited

U.S. PATENT DOCUMENTS

| | | | | |
|---|---|---|---|---|
| 6,895,261 B1* | 5/2005 | Palamides | H04B 1/385 | 455/100 |
| 7,137,549 B2* | 11/2006 | Silverbrook | G06F 3/014 | 235/375 |
| 7,216,109 B1* | 5/2007 | Donner | G06Q 10/02 | 235/382 |
| 7,295,532 B2* | 11/2007 | Haller | G06F 9/44526 | 370/328 |
| 7,342,510 B2* | 3/2008 | Pate | G09F 19/22 | 116/63 P |
| 7,424,267 B2* | 9/2008 | Eisenbach | G06F 21/62 | 455/41.2 |
| 7,457,879 B2* | 11/2008 | Horvitz | G06Q 10/107 | 706/46 |
| 7,693,744 B2* | 4/2010 | Forbes | G06Q 30/02 | 705/14.64 |
| 7,748,636 B2* | 7/2010 | Finn | G06K 7/0008 | 235/375 |
| 7,797,204 B2* | 9/2010 | Balent | G06Q 10/087 | 705/26.8 |
| 7,974,873 B2* | 7/2011 | Simmons | G06Q 10/06313 | 455/12.1 |
| 7,979,899 B2* | 7/2011 | Guo | H04L 63/0823 | 726/20 |
| 8,103,665 B2* | 1/2012 | Abbott | G06F 17/30867 | 707/729 |
| 8,116,724 B2* | 2/2012 | Peabody | G08B 25/016 | 340/539.13 |
| 8,170,656 B2* | 5/2012 | Tan | G06F 1/163 | 345/157 |
| 8,216,049 B2* | 7/2012 | Fisk | G07F 17/32 | 463/16 |
| 8,341,027 B2* | 12/2012 | Yeung | G06Q 30/018 | 235/379 |
| 8,348,149 B1* | 1/2013 | Boudville | G06Q 10/10 | 235/375 |
| 8,395,658 B2* | 3/2013 | Corson | G06F 3/0428 | 348/47 |
| 8,539,359 B2* | 9/2013 | Rapaport | G06Q 10/10 | 709/217 |
| 8,581,700 B2* | 11/2013 | Kawamura | H04N 7/185 | 340/10.1 |
| 8,660,897 B2* | 2/2014 | Abhyanker | H04B 5/0031 | 705/14.22 |
| 8,689,247 B2* | 4/2014 | Lo | G06Q 30/02 | 725/31 |
| 8,718,558 B2* | 5/2014 | Montemurro | H04W 76/026 | 455/103 |
| 8,761,099 B2* | 6/2014 | Charbit | H04W 72/04 | 370/329 |
| 8,775,850 B2* | 7/2014 | Moy | G06F 3/1423 | 455/556.2 |
| 8,850,037 B2* | 9/2014 | McDonough | H04L 67/02 | 709/220 |
| 8,949,146 B2* | 2/2015 | Fisher | G06Q 10/02 | 705/26.1 |
| 8,953,490 B2* | 2/2015 | Montemurro | H04W 4/206 | 370/239 |
| 8,965,824 B2* | 2/2015 | Chun | G06Q 50/24 | 705/2 |
| 9,002,411 B2* | 4/2015 | Moore | G09F 21/026 | 455/566 |
| 9,084,003 B1* | 7/2015 | Sanio | H04N 21/4126 | |
| 9,100,675 B2* | 8/2015 | Gillies | G06Q 30/02 | |
| 9,100,944 B2* | 8/2015 | Newham | H04W 4/08 | |
| 9,129,294 B2* | 9/2015 | Yahn | G06Q 30/02 | |
| 9,143,912 B2* | 9/2015 | Leppanen | H04W 4/08 | |
| 9,147,191 B2* | 9/2015 | Cohen | G06F 21/33 | |
| 9,159,080 B2* | 10/2015 | Fiorucci | G06Q 30/0226 | |
| 9,204,257 B1* | 12/2015 | Mendelson | G08G 1/14 | |
| 9,258,385 B2* | 2/2016 | Neo | G06F 8/61 | |
| 9,301,092 B2* | 3/2016 | Huang | H04W 4/02 | |
| 9,306,897 B2* | 4/2016 | Luna | H04L 51/32 | |
| 9,325,939 B2* | 4/2016 | Schultz | H04N 7/144 | |
| 9,374,619 B2* | 6/2016 | Andreasen | H04N 21/4227 | |
| 9,402,055 B2* | 7/2016 | Makela | H04N 7/15 | |
| 9,532,259 B2* | 12/2016 | Larsson | H04W 28/0226 | |
| 2002/0101346 A1* | 8/2002 | Busick | B67D 3/0032 | 340/521 |
| 2002/0107610 A1* | 8/2002 | Kaehler | G06Q 20/387 | 700/232 |
| 2002/0171400 A1* | 11/2002 | Koyama | G04G 19/08 | 320/135 |
| 2003/0035397 A1* | 2/2003 | Haller | G06F 9/44526 | 370/338 |
| 2004/0049412 A1* | 3/2004 | Johnson | G06Q 10/02 | 705/5 |
| 2004/0083380 A1* | 4/2004 | Janke | G06K 19/073 | 713/194 |
| 2004/0195311 A1* | 10/2004 | Silverbrook | G06F 3/014 | 235/375 |
| 2005/0160270 A1* | 7/2005 | Goldberg | G10H 1/0025 | 713/176 |
| 2006/0089914 A1* | 4/2006 | Shiel | G06Q 30/00 | 705/52 |
| 2006/0199537 A1* | 9/2006 | Eisenbach | G06F 21/62 | 455/41.2 |
| 2006/0205477 A1* | 9/2006 | Fisk | G07F 17/32 | 463/17 |
| 2007/0055146 A1* | 3/2007 | Corlette | A61B 5/0205 | 600/430 |
| 2007/0103552 A1* | 5/2007 | Patel | H04N 5/913 | 348/203 |
| 2008/0014867 A1* | 1/2008 | Finn | G06K 7/0008 | 455/41.1 |
| 2008/0052192 A1* | 2/2008 | Fisher | G06Q 10/02 | 705/5 |
| 2008/0062257 A1* | 3/2008 | Corson | G06F 3/0428 | 348/47 |
| 2008/0123683 A1* | 5/2008 | Cheng | H04M 7/0036 | 370/464 |
| 2008/0148637 A1* | 6/2008 | Pate | G09F 19/22 | 49/49 |
| 2008/0208681 A1* | 8/2008 | Hammad | G06Q 20/045 | 705/13 |
| 2008/0235108 A1* | 9/2008 | Kulakowski | G06Q 10/02 | 705/5 |
| 2008/0294556 A1* | 11/2008 | Anderson | G06Q 20/40 | 705/44 |
| 2009/0058611 A1* | 3/2009 | Kawamura | H04N 7/185 | 340/10.1 |
| 2009/0063643 A1* | 3/2009 | Setiawan | G06Q 10/00 | 709/206 |
| 2009/0125387 A1* | 5/2009 | Mak | G06Q 10/02 | 705/14.73 |
| 2009/0147684 A1* | 6/2009 | Majidi-Ahy | H04L 12/66 | 370/236 |
| 2009/0228325 A1* | 9/2009 | Simmons | G06Q 10/06313 | 705/7.23 |
| 2009/0254930 A1* | 10/2009 | Lo | G06Q 30/02 | 725/2 |
| 2009/0300744 A1* | 12/2009 | Guo | H04L 63/0823 | 726/7 |
| 2009/0326406 A1* | 12/2009 | Tan | G06F 3/015 | 600/546 |
| 2010/0061294 A1* | 3/2010 | Proctor, Jr. | G06Q 30/0623 | 370/328 |
| 2010/0064307 A1* | 3/2010 | Malhotra | H04L 65/1086 | 725/24 |
| 2010/0105375 A1* | 4/2010 | Schroter | H04L 63/0853 | 455/419 |
| 2010/0122274 A1* | 5/2010 | Gillies | G06Q 30/02 | 725/2 |
| 2010/0146559 A1* | 6/2010 | Lee | H04L 12/1822 | 725/61 |
| 2010/0268659 A1* | 10/2010 | Zimberoff | G06Q 10/08 | 705/336 |

(56) References Cited

U.S. PATENT DOCUMENTS

| | | | | |
|---|---|---|---|---|
| 2010/0285771 A1* | 11/2010 | Peabody | G08B 25/016 | 455/404.2 |
| 2011/0026503 A1* | 2/2011 | Mueck | H04W 48/10 | 370/338 |
| 2011/0131085 A1* | 6/2011 | Wey | G06Q 30/02 | 705/14.16 |
| 2011/0231292 A1* | 9/2011 | McCown | G06Q 20/223 | 705/27.1 |
| 2011/0243053 A1* | 10/2011 | Tinnakornsrisuphap | H04L 12/189 | 370/312 |
| 2011/0274155 A1* | 11/2011 | Noh | H04N 21/23439 | 375/240.01 |
| 2011/0281550 A1* | 11/2011 | Peabody | G08B 25/016 | 455/404.2 |
| 2011/0298613 A1* | 12/2011 | Ben Ayed | A61B 5/002 | 340/539.11 |
| 2012/0023089 A1* | 1/2012 | Chandra | G06F 17/30899 | 707/709 |
| 2012/0033616 A1* | 2/2012 | Sun | H04L 12/581 | 370/328 |
| 2012/0041982 A1* | 2/2012 | Jennings | G06F 17/30265 | 707/784 |
| 2012/0071128 A1* | 3/2012 | Zellner | G08B 25/08 | 455/404.1 |
| 2012/0084222 A1* | 4/2012 | Zimberoff | G06Q 10/08 | 705/330 |
| 2012/0091202 A1* | 4/2012 | Cohen | G06F 21/33 | 235/382 |
| 2012/0129608 A1* | 5/2012 | Stegman | G07F 17/3234 | 463/42 |
| 2012/0190386 A1* | 7/2012 | Anderson | G01C 15/04 | 455/456.3 |
| 2012/0191542 A1* | 7/2012 | Nurmi | A61B 5/16 | 705/14.54 |
| 2012/0209926 A1* | 8/2012 | Backholm | G06Q 50/01 | 709/206 |
| 2013/0007499 A1* | 1/2013 | Moy | G06F 3/1423 | 713/400 |
| 2013/0013698 A1* | 1/2013 | Relyea | H04L 67/06 | 709/206 |
| 2013/0017880 A1* | 1/2013 | Fisk | G07F 17/32 | 463/19 |
| 2013/0059526 A1* | 3/2013 | Moore | G09F 21/026 | 455/3.06 |
| 2013/0060618 A1* | 3/2013 | Barton | G06Q 20/3674 | 705/14.23 |
| 2013/0066660 A1* | 3/2013 | Kopitzke | G06Q 10/02 | 705/5 |
| 2013/0097079 A1* | 4/2013 | Bruder | G06Q 20/425 | 705/44 |
| 2013/0143529 A1* | 6/2013 | Leppanen | H04W 4/08 | 455/411 |
| 2013/0173402 A1* | 7/2013 | Young | G06Q 30/0631 | 705/14.73 |
| 2013/0217336 A1* | 8/2013 | McCormack | H04W 8/085 | 455/41.2 |
| 2013/0229944 A1* | 9/2013 | Montemurro | H04W 4/206 | 370/254 |
| 2013/0281020 A1* | 10/2013 | Montemurro | H04W 76/026 | 455/41.2 |
| 2013/0282169 A1* | 10/2013 | Moore | G07F 7/00 | 700/235 |
| 2013/0297698 A1* | 11/2013 | Odero | H04L 69/24 | 709/204 |
| 2013/0339091 A1* | 12/2013 | Humay | G06Q 30/0203 | 705/7.32 |
| 2014/0025573 A1* | 1/2014 | Keronen | G06Q 20/322 | 705/41 |
| 2014/0045480 A1* | 2/2014 | Hsieh | G06F 1/1643 | 455/418 |
| 2014/0085218 A1* | 3/2014 | Lee | G06F 1/1626 | 345/173 |
| 2014/0095420 A1* | 4/2014 | Chun | G06Q 50/24 | 706/46 |
| 2014/0106677 A1* | 4/2014 | Altman | H04B 1/3827 | 455/41.2 |
| 2014/0108260 A1* | 4/2014 | Poole | G06Q 20/3226 | 705/64 |
| 2014/0129422 A1* | 5/2014 | Zhou | G06Q 40/025 | 705/38 |
| 2014/0143037 A1* | 5/2014 | Zhou | G06Q 30/0226 | 705/14.17 |
| 2014/0143545 A1* | 5/2014 | McKeeman | H04L 63/0853 | 713/168 |
| 2014/0143682 A1* | 5/2014 | Druck | G06Q 10/107 | 715/752 |
| 2014/0165090 A1* | 6/2014 | Andreasen | H04N 21/4227 | 725/25 |
| 2014/0179233 A1* | 6/2014 | Kang | H04L 67/16 | 455/41.2 |
| 2014/0188637 A1* | 7/2014 | Balasubramaniam | G06Q 50/12 | 705/15 |
| 2014/0225730 A1* | 8/2014 | Depascale | G08B 21/0288 | 340/539.13 |
| 2014/0254460 A1* | 9/2014 | Lim | H04L 1/0076 | 370/312 |
| 2014/0254466 A1* | 9/2014 | Wurster | H04L 12/189 | 370/312 |
| 2014/0256339 A1* | 9/2014 | Lim | H04W 76/025 | 455/452.1 |
| 2014/0278475 A1* | 9/2014 | Tran | G06F 19/3418 | 705/2 |
| 2014/0279541 A1* | 9/2014 | Castrechini | G06Q 20/3274 | 705/44 |
| 2014/0320532 A1* | 10/2014 | Kim | G02B 27/017 | 345/633 |
| 2014/0347289 A1* | 11/2014 | Suh | G06F 3/017 | 345/173 |
| 2014/0349692 A1* | 11/2014 | Zhou | G06Q 20/3829 | 455/466 |
| 2014/0358951 A1* | 12/2014 | Luna | H04L 51/32 | 707/758 |
| 2014/0359140 A1* | 12/2014 | Shankarraman | H04L 65/1069 | 709/227 |
| 2014/0372762 A1* | 12/2014 | Flautner | H04L 9/3226 | 713/173 |
| 2015/0003320 A1* | 1/2015 | Anderson | H04W 12/06 | 370/328 |
| 2015/0019714 A1* | 1/2015 | Shaashua | H04L 67/24 | 709/224 |
| 2015/0032795 A1* | 1/2015 | Robbins | H04W 4/005 | 709/202 |
| 2015/0049657 A1* | 2/2015 | Cheng | H04W 52/028 | 370/311 |
| 2015/0058235 A1* | 2/2015 | Kahan | G06Q 10/1093 | 705/319 |
| 2015/0065055 A1* | 3/2015 | Newham | H04W 4/008 | 455/41.3 |
| 2015/0065082 A1* | 3/2015 | Sehgal | H04W 4/22 | 455/404.2 |
| 2015/0066817 A1* | 3/2015 | Slayton | G06N 5/04 | 706/11 |
| 2015/0067503 A1* | 3/2015 | Slayton | G06F 9/4446 | 715/708 |
| 2015/0072731 A1* | 3/2015 | Salmon | H04M 1/7253 | 455/557 |
| 2015/0077737 A1* | 3/2015 | Belinsky | G01N 21/53 | 356/51 |
| 2015/0104004 A1* | 4/2015 | Holman | H04N 1/4486 | 380/28 |
| 2015/0104012 A1* | 4/2015 | Holman | H04N 1/4486 | 380/243 |
| 2015/0105901 A1* | 4/2015 | Joshi | G06Q 20/18 | 700/232 |
| 2015/0106296 A1* | 4/2015 | Robinson | G06F 21/62 | 705/339 |
| 2015/0120550 A1* | 4/2015 | Jung | G06Q 20/3224 | 705/44 |

(56) References Cited

U.S. PATENT DOCUMENTS

| | | | |
|---|---|---|---|
| 2015/0149924 A1* | 5/2015 | Tsai | G06F 3/017 715/748 |
| 2015/0156031 A1* | 6/2015 | Fadell | H04L 12/2816 700/276 |
| 2015/0161632 A1* | 6/2015 | Humay | G06Q 30/0203 705/7.32 |
| 2015/0170249 A1* | 6/2015 | Cockcroft | G06Q 30/0627 705/26.63 |
| 2015/0181840 A1* | 7/2015 | Tupin, Jr. | A01K 27/009 600/483 |
| 2015/0195692 A1* | 7/2015 | Chow | H04M 19/04 455/414.1 |
| 2015/0200915 A1* | 7/2015 | Yeager | H04L 63/0421 713/155 |
| 2015/0206130 A1* | 7/2015 | Fisher | G06Q 10/02 705/44 |
| 2015/0223705 A1* | 8/2015 | Sadhu | G01S 19/17 600/301 |
| 2015/0223731 A1* | 8/2015 | Sahin | A61B 5/16 600/301 |
| 2015/0242837 A1* | 8/2015 | Yarbrough | G06Q 20/327 705/44 |
| 2015/0242895 A1* | 8/2015 | Brown | G06Q 30/0257 705/14.55 |
| 2015/0245164 A1* | 8/2015 | Merrill | H04W 4/06 370/329 |
| 2015/0248651 A1* | 9/2015 | Akutagawa | G06Q 10/1095 705/7.19 |
| 2015/0261948 A1* | 9/2015 | Marra | G06F 21/34 726/4 |
| 2015/0279147 A1* | 10/2015 | Illingworth | G07F 11/002 700/232 |
| 2015/0286813 A1* | 10/2015 | Jakobsson | G06F 21/35 726/9 |
| 2015/0288797 A1* | 10/2015 | Vincent | H04M 1/72538 455/404.2 |
| 2015/0294394 A1* | 10/2015 | Shreve | G06Q 30/0635 705/26.81 |
| 2015/0295993 A1* | 10/2015 | Hanuschak | H04M 1/6083 715/740 |
| 2015/0302376 A1* | 10/2015 | Fisher | G06Q 10/02 705/21 |
| 2015/0304828 A1* | 10/2015 | Varoglu | H04W 4/16 455/414.1 |
| 2015/0332031 A1* | 11/2015 | Mistry | G06F 21/316 726/19 |
| 2015/0343144 A1* | 12/2015 | Altschul | A61K 45/06 604/503 |
| 2015/0347930 A1* | 12/2015 | Cohen | G06F 21/33 705/5 |
| 2015/0356548 A1* | 12/2015 | Luna-Rodriguez | G06Q 20/3224 705/39 |
| 2016/0004788 A1* | 1/2016 | Elgort | G06Q 30/0631 707/722 |
| 2016/0006849 A1* | 1/2016 | Yang | H04M 1/6066 455/415 |
| 2016/0006983 A1* | 1/2016 | Makela | H04N 7/15 348/14.03 |
| 2016/0012465 A1* | 1/2016 | Sharp | G06Q 20/18 705/14.17 |
| 2016/0021154 A1* | 1/2016 | Schoeffler | G06Q 10/10 709/204 |
| 2016/0027076 A1* | 1/2016 | Jackson | H04L 67/1095 709/217 |
| 2016/0027079 A1* | 1/2016 | Schoeffler | H04N 5/23293 705/325 |
| 2016/0028726 A1* | 1/2016 | Matthews | H04L 63/0492 726/5 |
| 2016/0029182 A1* | 1/2016 | Leppanen | H04W 4/08 455/416 |
| 2016/0034696 A1* | 2/2016 | Jooste | G06F 1/163 726/1 |
| 2016/0048722 A1* | 2/2016 | Tayeh | G06K 9/00302 382/118 |
| 2016/0050391 A1* | 2/2016 | Schultz | H04N 7/144 348/14.07 |
| 2016/0057139 A1* | 2/2016 | McDonough | H04L 63/0861 726/6 |
| 2016/0057215 A1* | 2/2016 | Rayanki | H04L 67/1051 709/228 |
| 2016/0057285 A1* | 2/2016 | Lee | H04M 3/42153 455/417 |
| 2016/0064955 A1* | 3/2016 | Zuerner | H02J 7/007 705/39 |
| 2016/0065630 A1* | 3/2016 | Gupta | G06F 17/30876 709/204 |
| 2016/0066353 A1* | 3/2016 | Kumar | H04W 76/021 709/227 |
| 2016/0077710 A1* | 3/2016 | Lewis | G06F 3/04842 715/716 |
| 2016/0087933 A1* | 3/2016 | Johnson | H04W 4/001 709/245 |
| 2016/0095140 A1* | 3/2016 | Gupta | H04W 4/206 370/252 |
| 2016/0099892 A1* | 4/2016 | Palakovich | H04L 51/04 709/206 |
| 2016/0105722 A1* | 4/2016 | Wang | H04N 21/4182 725/14 |
| 2016/0132046 A1* | 5/2016 | Beoughter | G06F 17/30554 700/17 |
| 2016/0143079 A1* | 5/2016 | Yoon | H04W 76/02 455/41.1 |
| 2016/0162873 A1* | 6/2016 | Zhou | G06Q 20/3227 705/67 |
| 2016/0173359 A1* | 6/2016 | Brenner | G06F 19/00 600/301 |
| 2016/0174025 A1* | 6/2016 | Chaudhri | H04W 4/02 455/41.1 |
| 2016/0203522 A1* | 7/2016 | Shiffert | H04W 4/06 705/14.58 |
| 2016/0342810 A1* | 11/2016 | Needham | G06F 17/00 |

FOREIGN PATENT DOCUMENTS

| | | |
|---|---|---|
| CN | 103825905 A | 5/2014 |
| CN | 104009783 A | 8/2014 |

* cited by examiner

COMMUNICATION METHOD AND DEVICE

CROSS-REFERENCE TO RELATED APPLICATION

This application claims priority to Chinese patent application no. CN 201410531198.6, filed Oct. 10, 2014, which is incorporated herein in its entirety by reference.

TECHNICAL FIELD

The present disclosure refers to the field of communication technology, particularly to a communication method and device.

BACKGROUND

Social software for strangers can be based on geographic location, e.g., strangers in a bar communicating through social software. Using location function of a mobile phone, the position information of users currently using the social software can be sent to the server terminal by the social software. Then, the location and range can be compared at the server-side in order to find some users nearby, and the related information of users in a close range can be issued to the social software such that those users may find out each other.

SUMMARY

Social software on a mobile phone can operate if the mobile phone is connected to the Internet. However, connection to the Internet might be limited in some cases, such as on a train or a plane. In addition, the positioning accuracy can be low, such as indoors environments without GPS signals, where the positioning accuracy is poor, as the positioning is performed through wireless base station. Moreover, position information of the users is stored at the server, which increases the risk of privacy leak.

A communication method and device is provided according to the present disclosure for implementing a communication between two communication terminals of strangers without being connected to the Internet.

In a first aspect of the present disclosure, a communication method is provided for a wearable device, which includes transmitting a broadcast package via Bluetooth, which comprises identity information of a first communication client terminal, obtaining communication information sent by a second communication client terminal upon receiving the broadcast package and communicating with the first communication client terminal via Bluetooth; and assisting in completing a communication between the first communication client terminal and the second communication client terminal based on the communication information.

In an implementation, the assisting in completing a communication between the first communication client terminal and the second communication client terminal includes upon determining that the communication information is a notification message, sending the notification message to the first communication client terminal via Bluetooth or providing a prompt, or upon determining that the communication information is a stranger message, sending the stranger message to the first communication client terminal via Bluetooth, or upon determining that the communication information is an adding friends request, sending the adding friends request to the first communication client terminal.

In some implementations, the communication further includes bonding the wearable device with the first communication device.

In a second aspect of the present disclosure, a communication method is provided for a second client, which includes receiving a broadcast package transmitted by a wearable device via Bluetooth, the broadcast package including identity information of a first communication client terminal, displaying the identity information of the first communication client terminal, transmitting communication information, communicated with the first communication client terminal by the second communication client terminal, to the wearable device via Bluetooth, and a communication between the first communication client terminal and the second communication client terminal is assisted and implemented by the wearable device according to the communication information.

In an implementation, the transmitting communication information, communicated with the first communication client terminal by the second communication client terminal, to the wearable device via Bluetooth, and a communication between the first communication client terminal and the second communication client terminal is assisted and implemented by the wearable device according to the communication information may includes sending a notification message to the wearable device via Bluetooth, the notification message is sent to the first communication client terminal via Bluetooth or a prompt is provided by the wearable device via Bluetooth; or sending a stranger message to the wearable device, the stranger message is sent to the first communication client terminal via Bluetooth by the wearable device via Bluetooth; or sending an adding friends request to the wearable device, the adding friends request is sent to the first communication client terminal by the wearable device via Bluetooth.

In a third aspect of implementations of the present disclosure, a communication device is provided for a wearable device, which comprises a first transmitting module configured to transmit a broadcast package via Bluetooth, which comprises identity information of a first communication client terminal, an obtaining module configured to obtain communication information sent by a second communication client terminal after receiving the broadcast package, and communicated with the first communication client terminal by the second communication client terminal via Bluetooth, and an assisting module configured to assist and implement a communication between the first communication client terminal and the second communication client terminal according to the communication information.

In an implementation, a first assisting sub-module is configured to send the notification message to the first communication client terminal via Bluetooth or provide a prompt, when the communication information is a notification message. This implementation can also include a second assisting sub-module configured to send the stranger message to the first communication client terminal via Bluetooth, when the communication information is a stranger message, or a third assisting sub-module configured to send the adding friends request to the first communication client terminal, when the communication information is an adding friends request, or both.

In some implementations, the device further comprises a bonding module configured to bond the wearable device with the first communication device.

In a fourth aspect of implementations of the present disclosure, a device is provided for a second communication device, which comprises a receiving module configured to receive a broadcast package transmitted by a wearable device via Bluetooth, which comprises identity information of a first communication client terminal, a display module configured to display the identity information of a first communication client terminal, a second transmitting module configured to transmit communication information communicated with the first communication client terminal by the second communication client terminal to the wearable device via Bluetooth, and a communication between the first communication client terminal and the second communication client terminal is assisted and implemented through the wearable device according to the communication information.

In an implementation, the second transmitting module comprises a first transmitting sub-module configured to send a notification message to the wearable device via Bluetooth, a notification message is sent to the first communication client terminal via Bluetooth or a prompt is provided by the wearable device; or a second transmitting sub-module configured to send a stranger message to the wearable device via Bluetooth, the stranger message is sent to the first communication client terminal by the wearable device via Bluetooth; or a third transmitting sub-module configured to send an adding friends request to the wearable device via Bluetooth, the adding friends request is sent to the first communication client terminal by the wearable device via Bluetooth.

As a wearable device can be considered as a transferring device between two communication terminals, information transfer between two communication terminals can be implemented through the Bluetooth function of the wearable device. Therefore, two communication terminals may communicate with each other without needing an Internet connection. Furthermore, Bluetooth can improve position accuracy, and user information is not necessarily sent to the server, so as to avoid privacy leaks.

It is understood that the general description above and detail description below are merely exemplary and explanatory, not to limit the present disclosure.

BRIEF DESCRIPTION OF THE DRAWINGS

The accompanying drawings, which are included to provide a further understanding of the present disclosure and constitute a part of this specification, are used for explaining the present disclosure together with implementations of the present disclosure.

DETAILED DESCRIPTION

Certain implementations will be described herein and the illustrative representations thereof are shown in drawings. Unless otherwise specified, like numerical representations are representatives of same or similar elements in different drawings. The implementations described herein are not all of implementations in consistence with the present disclosure and are just examples of devices and methods in consistence with some aspects of the present disclosure as described in the accompanied claims.

Figure 1:
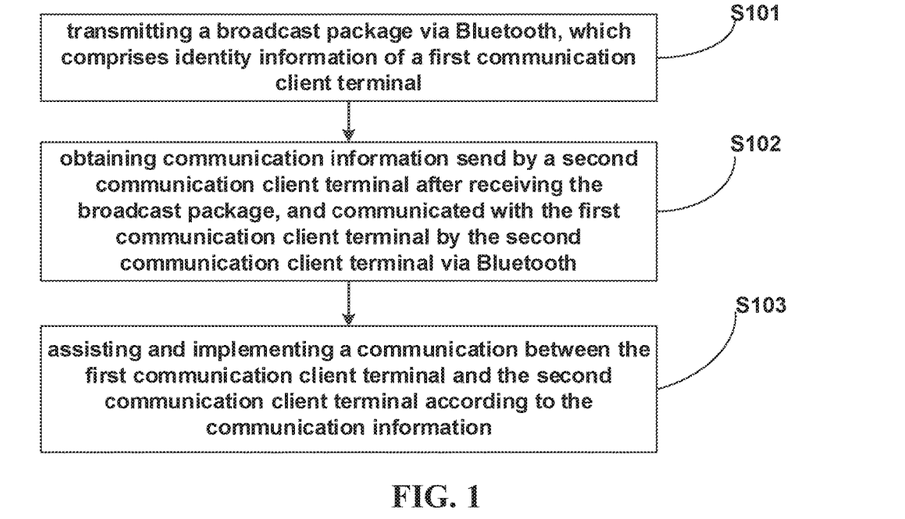
FIG. 1 is a flow chart of a communication method according to one implementation.

FIG. 1 is a flow chart of a communication method according to one example implementation. The wearable device can be a smart device suitable for being put on a human body, such as a smart band, a smart watch, a smarty ring, a smart Necklace, a smart toggle clip, a smart Belt, a Head Mount Display and the like. As illustrated in FIG. 1, the method can include steps S101-S103.

At Step S101, a broadcast package is transmitted via Bluetooth. The broadcast package can include identity information of a first communication client terminal Bluetooth is an accurate and effective short-range wireless connection technique. In an implementation, the wearable device includes a Bluetooth chip with low power consumption, which operates in Bluetooth low energy (BLE) mode. The broadcast package is periodically transmitted to external devices by the wearable device. For example, the broadcast package can include identity information of a first communication client terminal The identity information can include, for example, a personal identification S, which can be randomly generated.

In an implementation, the wearable device is supportive of the transmitting of specific Bluetooth broadcast package, even if the wearable device is in a connection with some communication client terminal, which may continue to transmit broadcast package and receive messages through signaling channel.

At Step S102, communication information sent by a second communication client terminal after receiving the broadcast package, and communicated with the first communication client terminal by the second communication client terminal via Bluetooth is obtained.

In an implementation, after Step S101, the client terminal is switched on by the user of the second communication client terminal. For example, a broadcast package transmitted by the wearable device around is scanned, the broadcast package is received by the second communication client terminal, and the personal identification code S included in the broadcast package is read by the second communication client terminal, and then personal information of the user, such as "nickname", "gender" and the like included in the personal identification code S are extracted and displayed on the second communication client terminal, and then communication information may be sent to the first communication client terminal by the second communication client terminal At Step S103, a communication between the first communication client terminal and the second communication client terminal assisting in completing according to the communication information.

In an implementation, Step S103 may be implemented as in one or more of following three modes.

Mode A: when the communication information is a notification message, the notification message is sent to the first communication client terminal via Bluetooth or providing a prompt.

The notification information is sent to the wearable device through clicking the nickname or profile photo for the user of the first communication client terminal by the user of the second communication client terminal, and is received by the wearable device. The notification information may, for example, be a greeting message. The wearable device may prompt the user that the notification message sent by the user of the second communication client terminal is received by vibration, ringing, lights on or flash light of the wearable device, and the wearable device may also send the notification message to the user of the first communication client terminal.

Mode B: when the communication information is a stranger message, the stranger message is sent to the first communication client terminal via Bluetooth.

The stranger message is a message from a stranger, such as a "Hello" message. When the communication information sent by the user of the second communication client terminal is a stranger message, the stranger message is first sent to the wearable device by the second communication client terminal and then sent to the first communication client terminal by the wearable device.

In an implementation, sending the stranger message to the first communication client terminal by the second communication client terminal can be implemented as follows.

For example, the profile photo of the user of the first communication client terminal can be long-pressed by the user of the second communication client terminal. If a stranger message is allowed to be sent by the user of the first communication client terminal, an input field can be displayed, then a message "Hello" can be inputted and a transmission can be confirmed. The message "Hello" can be sent to the wearable device of the user of the first communication client terminal via Bluetooth, after the message is received by the wearable device, the message is sent to the first communication client terminal, such that the message may be seen by the user of the first communication client terminal. The user of the first communication client terminal may respond to this message, and the responded message may be transferred by the wearable device and then sent to the second communication client terminal, thereby accomplishing the interaction between the second communication client terminal and the first communication client terminal.

Mode C: when the communication information is an adding friends request ("friend request"), the adding friends request is sent to the first communication client terminal.

If the user of the second communication client terminal intends to build a permanent friend relationship with the user of the first communication client terminal, the user of the first communication client terminal may be requested to be added as a friend. The adding friends request may be first sent to the wearable device by the user of the second communication client terminal, and then sent to the user of the first communication client terminal by the wearable device.

The personal identification code S sent by the wearable device may also include a personal identification string, which may be bonded (or "paired") to the identification information of the user of the first communication client terminal though the personal identification string, and the bonding relationship may be stored in a server. After the user of the first communication client terminal confirms and allows to add a friend, the personal identification code S of the user of the first communication client terminal is reserved by the user of the second communication client terminal, when connecting to the Internet, the personal identification string included in the personal identification code S is sent to the server, the real identification information of the first communication terminal stored in a cloud is obtained, such that adding friends is successively accomplished. If the Internet is not available, the personal identification code S may also be locally reserved, and the friend relationship may be confirmed after connecting to the Internet.

In an implementation, the wearable device can be bonded with the first communication device. The identity may be input into and recorded by the wearable device to accomplish the bonding operation.

In the communication method according to the present disclosure, the wearable device functions as a transferring device between two communication client terminals, the information transfer between two stranger communication client terminals is implemented through Bluetooth function of the wearable device, such that the two communication client terminal still can communicate with each other without Internet connection; and the position accuracy is improved by communicating with Bluetooth, and it is not necessary to send user information to the server, thereby avoid privacy leaks.

Figure 2:
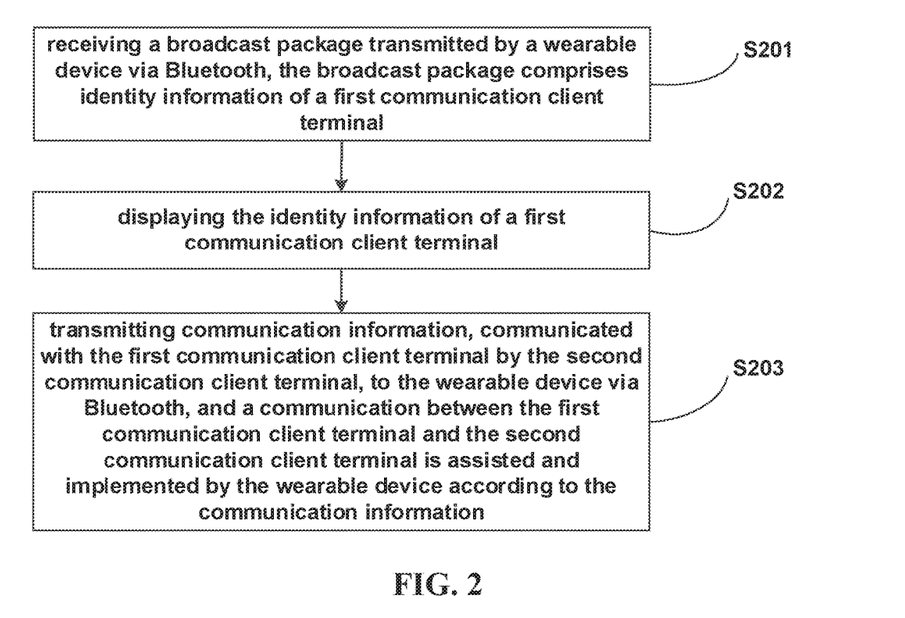
FIG. 2 is a flow chart of another communication method according to one implementation.

FIG. 2 is a flow chart of another communication method according to one exemplary implementation. The second communication client terminal may be a client terminal including a cell phone, a tablet computer, a digital broadcasting terminal, a message transceiver, a personal digital assistance and the like. The wearable device may be a Smart devise suitable for being put on a human body, such as a Smartband, a Smartwatch, a Smarty Ring, a Smart Necklace, a Smart toggle clip, a Smart Belt, a Head Mount Display and the like. As illustrated in FIG. 2, the method includes steps S201-S203 as follows.

At Step S201, a broadcast package transmitted by a wearable device is received via Bluetooth, the broadcast package includes identity information of a first communication client terminal.

In an implementation, the broadcast package includes identity information of the first communication client terminal which includes a personal identification S, and the personal identification code S may be generated randomly.

At Step S202, the identity information of a first communication client terminal is displayed.

In an implementation, the personal identification code S included in the broadcast package is read by the second communication client terminal, and then personal information of the user, such as "nickname", "gender" and the like included in the personal identification code S are extracted and displayed on the second communication client terminal At Step S203, communication information, communicated with the first communication client terminal by the second communication client terminal, is transmitted to the wearable device via Bluetooth, and a communication between the first communication client terminal and the second communication client terminal is assisted and implemented by the wearable device according to the communication information.

In an implementation, Step S203 may be implemented in the one or more of the following three modes.

Mode One: a notification message is sent to the wearable device via Bluetooth, the notification message is sent to the first communication client terminal via Bluetooth or a prompt is provided by the wearable device via Bluetooth.

The notification information is sent to the wearable device through clicking the nickname or profile photo for the user of the first communication client terminal by the user of the second communication client terminal, and is received by the wearable device. The wearable device may prompt user that the notification message sent by the user of the second communication client terminal is received by the vibration, ringing, lights on or flash light of the wearable device, and the wearable device may also send the notification message to the user of the first communication client terminal.

Mode Two: a stranger message is sent to the wearable device, the stranger message is sent to the first communication client terminal via Bluetooth by the wearable device via Bluetooth.

The stranger message is a message from a stranger, such as "Hello", when the communication information sent by the user of the second communication client terminal is a stranger message, the stranger message is first sent to the wearable device by the second communication client terminal and then sent to the first communication client terminal by the wearable device.

Mode Three: an adding friends request is sent to the wearable device, the adding friends request is sent to the first communication client terminal by the wearable device via Bluetooth.

If the user of the second communication client terminal intends to build a permanent friend relationship with the user of the first communication client terminal, the user of the first communication client terminal may be requested to be added as a friend. The adding friends request may be first sent to the wearable device by the user of the second communication client terminal, and then sent to the user of the first communication client terminal by the wearable device. After the user of the first communication client terminal confirms and allows to add a friend, the personal identification code S of the user of the first communication client terminal is reserved by the user of the second communication client terminal, when connecting to the Internet, the personal identification string included in the personal identification code S is sent to the server, the real identification information of the first communication terminal stored in a cloud is obtained, such that adding friends is successively accomplished. If the Internet is not available, the personal identification code S may also be locally reserved, and the friend relationship may be confirmed after connecting to the Internet.

In the communication method according to the present disclosure, the wearable device functions as a transferring device between two communication client terminals, the information transfer between two stranger communication client terminals is implemented through Bluetooth function of the wearable device, such that the two communication client terminal still can communicate with each other without Internet connection; and the position accuracy is improved by communicating with Bluetooth, and it is not necessary to send user information to the server, thereby avoid privacy leaks.

Implementations will be described below to explain the above technical solutions according to the implementations of the present disclosure.

According to one implementation of the present disclosure, a communication method is provided, which is suitable for a second communication client terminal. The first communication client terminal may be a client terminal in mobile phone A, which is bonded with a wearable device. The second communication client terminal can be a client terminal in in mobile phone B. The wearable device can be a Smart band and identification information of the first communication client terminal is a personal identification code S.

Figure 3:
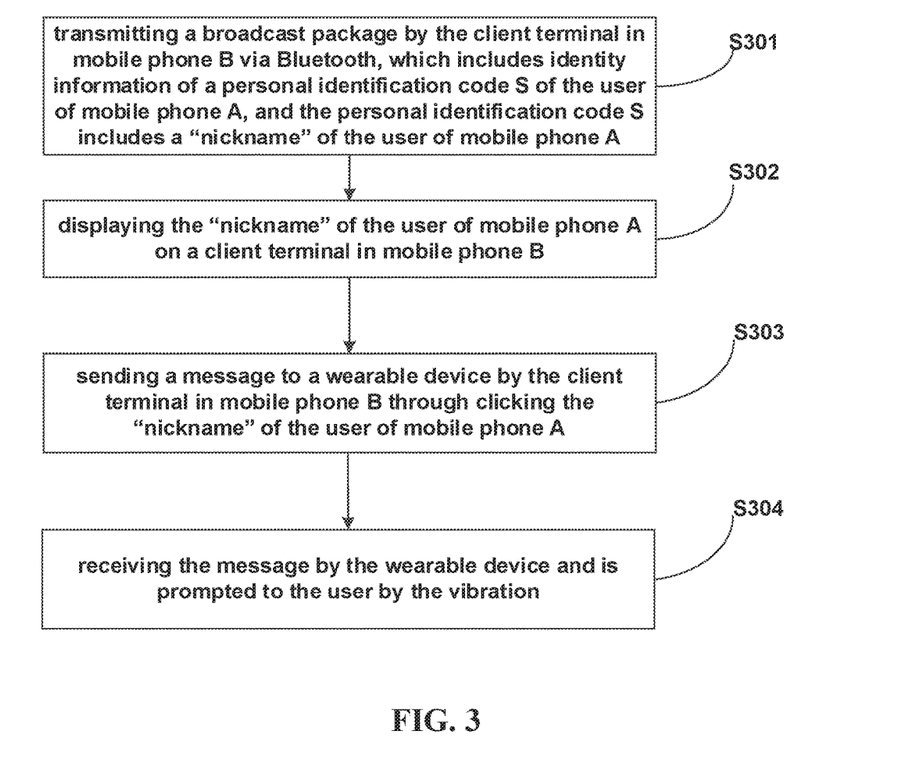
FIG. 3 is a flow chart of a communication method according to one implementation.

For example, the application scene may work as follows. A user of mobile phone A is on a train and wants to communication with strangers, broadcast packages are sent by the user of mobile phone A though a Smart band wore by the user of mobile phone A via Bluetooth. As illustrated in FIG. 3, operations on client terminal in mobile phone B are as follows.

At Step S301, a broadcast package is transmitted by the client terminal in mobile phone B via Bluetooth, which includes identity information of a personal identification code S of the user of mobile phone A, and the personal identification code S includes a "nickname" of the user of mobile phone A.

At Step S302, the "nickname" of the user of mobile phone A is displayed on a client terminal in mobile phone B.

At Step S303, a message is sent to a wearable device by the client terminal in mobile phone B through clicking the "nickname" of the user of mobile phone A.

At Step S304, the message is received by the wearable device and is prompted to the user by the vibration.

The above Step S304 may correspond to Mode One of the previous Step S203 and also may be performed as previous Mode Two or Three.

In this implementation, the wearable device functions as a transferring device between two communication client terminals, the information transfer between two stranger communication client terminals is implemented through Bluetooth function of the wearable device, such that the two communication client terminal still can communicate with each other without Internet connection; and the position accuracy is improved by communicating with Bluetooth, and it is not necessary to send user information to the server, thereby avoid privacy leaks.

Another implementation provides a communication method according to implementations of the present disclosure, which is suitable for a wearable device. The first communication client terminal may be a client terminal in mobile phone A which is bonded with a wearable device, the second communication client terminal is a client terminal in in mobile phone B, the wearable device is a Smartwatch and identification information of the first communication client terminal is a personal identification code S.

Figure 4:
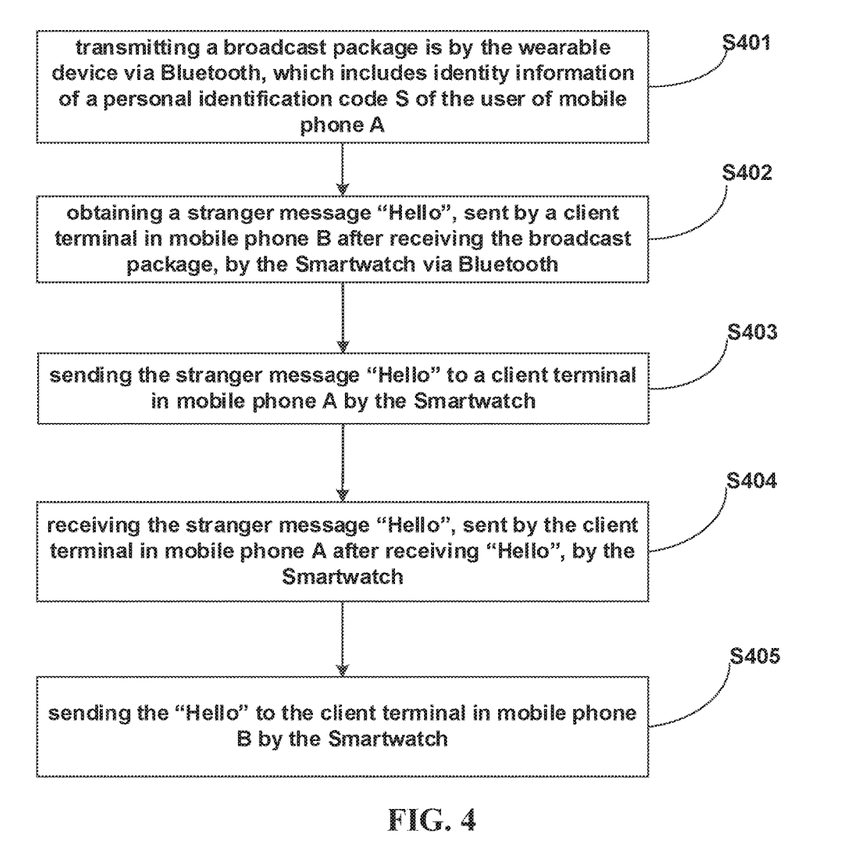
FIG. 4 is a flow chart of a communication method according to another implementation.

For example, the application scene can be as follows. A user of mobile phone A is in a bar and wants to communicate with strangers. As illustrated in FIG. 4, operations in a Smartwatch are as follows.

At Step S3401, a broadcast package is transmitted by the wearable device via Bluetooth, which includes identity information of a personal identification code S of the user of mobile phone A.

At Step S402, a stranger message "Hello", sent by a client terminal in mobile phone B after receiving the broadcast package, is obtained by the Smartwatch via Bluetooth.

At Step S403, the stranger message "Hello" is sent to a client terminal in mobile phone A by the Smartwatch.

At Step S404, the stranger message "Hello", sent by the client terminal in mobile phone A after receiving "Hello", is received by the Smartwatch.

At Step S405, the "Hello" is sent to the client terminal in mobile phone B by the Smartwatch.

The above Step S403-S405 may correspond to Mode B of the previous Step S103 and also may be performed as previous Mode A or C.

In this implementation, the wearable device functions as a transferring device between two communication client terminals, the information transfer between two stranger communication client terminals is implemented through Bluetooth function of the wearable device, such that the two communication client terminal still can communicate with each other without Internet connection; and the position accuracy is improved by communicating with Bluetooth, and it is not necessary to send user information to the server, thereby avoid privacy leaks.

Figure 5:
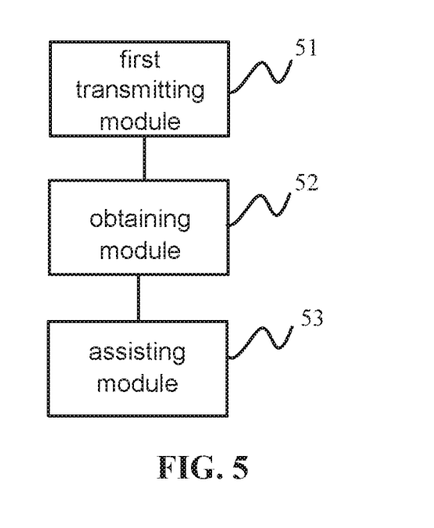
FIG. 5 is a block diagram showing a communication device according to an implementation.

FIG. 5 is a block diagram showing a communication device according to an example implementation. The communication device can be, for example, a wearable device. As illustrated in FIG. 5, the communication device includes a first transmitting module 51, which is configured to transmit a broadcast package via Bluetooth, which comprises identity information of a first communication client terminal.

The communication device includes an obtaining module 52, which is configured to obtain communication information sent by a second communication client terminal after receiving the broadcast package, and communicated with the first communication client terminal by the second communication client terminal via Bluetooth.

The communication device includes an assisting module 53, which is configured to assist and implement a communication between the first communication client terminal and the second communication client terminal according to the communication information.

In an implementation, the assisting module may include a first assisting sub-module, which is configured to send the notification message to the first communication client terminal via Bluetooth or provide a prompt, when the communication information is a notification message. Alternatively or additionally, the assisting module may include a second assisting sub-module, which is configured to send the stranger message to the first communication client terminal via Bluetooth, when the communication information is a stranger message. Alternatively or additionally, the assisting module may include a third assisting sub-module, which is configured to send the adding friends request to the first communication client terminal, when the communication information is an adding friends request.

In an implementation, the above device may also include a bonding module configured to bond the wearable device with the first communication device.

Figure 6:
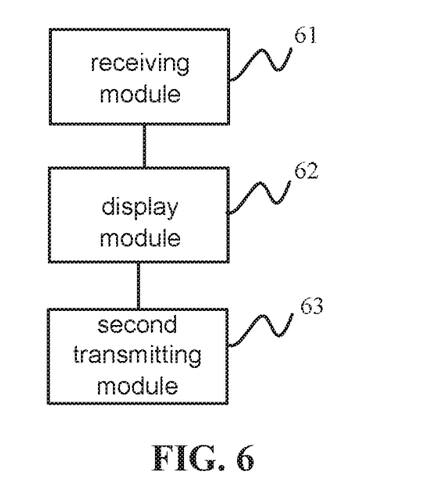
FIG. 6 is a block diagram showing another communication device according to an implementation.

FIG. 6 is a block diagram showing another communication device (e.g., second communication device) according to an implementation. As illustrated in FIG. 6, the communication device includes a receiving module 61, which is configured to receive a broadcast package transmitted by a wearable device via Bluetooth, which comprises identity information of a first communication client terminal. The communication device also includes a display module 62, which is configured to display the identity information of a first communication client terminal The communication device also includes a second transmitting module 63, which is configured to transmit communication information communicated with the first communication client terminal by the second communication client terminal to the wearable device via Bluetooth, and a communication between the first communication client terminal and the second communication client terminal is assisted and implemented through the wearable device according to the communication information.

In an implementation, the second transmitting module 63 includes a first transmitting sub-module, which is configured to send a notification message to the wearable device via Bluetooth. The notification message can be sent to the first communication client terminal via Bluetooth, or a prompt is provided by the wearable device. Alternatively or additionally, the second transmitting module 63 can include a second transmitting sub-module configured to send a stranger message to the wearable device via Bluetooth. The stranger message can be sent to the first communication client terminal by the wearable device via Bluetooth. Alternatively or additionally, the second transmitting module 63 can include a third transmitting sub-module configured to send a friends request to the wearable device via Bluetooth. The friends request can be sent to the first communication client terminal by the wearable device via Bluetooth.

With the communication devices according to the present disclosure, the wearable device functions as a transferring device between two communication client terminals. The information transfer between two stranger communication client terminals can be implemented through Bluetooth function of the wearable device, such that the two communication client terminal still can communicate with each other without any Internet connection. The position accuracy can also be improved by communicating through Bluetooth, and it is not necessary to send user information to the server, thereby avoiding privacy leaks.

Those skilled in the art should appreciate that implementations of the present disclosure can be provided as a method, system, or computer program product. Accordingly, the present disclosure may be of an entirely hardware implementation, an entirely software implementation, or a combination of forms of implementation of software and hardware aspects. Furthermore, the present disclosure may be implemented in the form of one or more of which comprises a computer usable program code computer usable storage media (including, but not limited to, disk storage, CD-ROM, optical memory, etc.) on a computer program product.

It should be understood by a person skilled in the art that the implementations of the present disclosure may be provided as a method, system, or computer program product. Accordingly, the present disclosure may take the form of an entirely hardware implementation, an entirely software implementation, or an implementation combining software and hardware aspects. Furthermore, the present disclosure may take the form of a computer program product that is implemented on one or more computer-usable storage media (including but not limited to disk storage and optical storage) having program code usable by computers stored therein.

The present disclosure is described with reference to flowcharts and/or block diagrams of methods, apparatuses (systems) and computer program products according to the implementations of the present disclosure. It should be understood that each procedure and/or block of the flowcharts and/or block diagrams, and combinations of procedures and/or blocks in the flowcharts and/or block diagrams, can be implemented by computer program instructions. These computer program instructions may be provided to a processor of a general purpose computer, special purpose computer, embedded processing device or other programmable data processing apparatuses to produce a machine, such that the instructions, which are executed via the processor of the computer or other programmable data processing apparatuses, create means for implementing the functions specified in one or more procedures of the flowcharts and/or one or more blocks of the block diagrams.

These computer program instructions may also be stored in a computer-readable memory that can direct a computer or other programmable data processing apparatuses to function in a particular manner, such that the instructions stored in the computer-readable memory produce an article of manufacture, including instruction means that implement the functions specified in one or more procedures of the flowcharts and/or one or more blocks of the block diagrams.

These computer program instructions may also be loaded onto a computer or other programmable data processing apparatuses to cause a series of operational steps to be performed on the computer or programmable apparatuses to produce a computer implemented process such that the instructions which are executed on the computer or programmable apparatuses provide steps for implementing the functions in one or more procedures of the flowcharts and/or one or more blocks of the block diagrams.

It is obvious to a person skilled in the art that various variations and modifications can be made to the present disclosure without departing from the spirit and scope of the present disclosure. Therefore, it is intended that these variations and modifications made to the present disclosure be encompassed by the present disclosure, as long as they fall within the scope of the claims of the present disclosure and their equivalents.

What is claimed is:

1. A communication method for a wearable device, comprising:
   transmitting, by the wearable device and via Bluetooth, a broadcast package including identity information of a first communication terminal;
   obtaining, from a second communication terminal, communication information generated upon receiving the broadcast package and communicating with the first communication terminal via Bluetooth, wherein the communication information is associated with at least one of a plurality of modes comprising a notification mode to indicate that a notification message has been sent to the wearable device, a stranger mode to indicate whether the wearable device is associated with a stranger message, and a friend request mode to request a personal identification code associated with the wearable device; and
   assisting in completing a communication between the first communication terminal and the second communication terminal based on the communication information.

2. The method according to claim 1, wherein the communication information is a notification message, and the assisting in completing a communication between the first communication terminal and the second communication terminal comprises one of: sending the notification message to the first communication terminal via Bluetooth, or providing a prompt.

3. The method according to claim 1, wherein the communication information is a stranger message, and the assisting in completing a communication between the first communication terminal and the second communication terminal comprises sending the stranger message to the first communication terminal via Bluetooth.

4. The method according to claim 1, wherein the communication information is a friend request, and the assisting in completing a communication between the first communication terminal and the second communication terminal comprises sending the friend request to the first communication terminal.

5. The method according to claim 1, further comprising:
   bonding the wearable device with the first communication device.

6. A method for communicating with a wearable device, comprising:
   receiving, a broadcast package transmitted by the wearable device via Bluetooth, wherein the broadcast package comprises identity information of a first communication terminal;
   displaying, at a second communication terminal, the identity information of the first communication terminal;
   transmitting, by the second communication terminal, communication information to the wearable device via Bluetooth, the communication information based on a first communication between the second communication terminal and the first communication terminal, wherein the communication information is associated with at least one of a plurality of modes comprising a stranger mode to indicate whether the wearable device is associated with a stranger message and a friend request mode to request a personal identification code associated with the wearable device, and is used to assist and implement a second communication between the first communication terminal and the second communication terminal.

7. The method according to claim 6, wherein transmitting, by the second communication terminal, communication information to the wearable device via Bluetooth, the communication information based on a first communication session between the second communication terminal and the first communication terminal, wherein the communication information is used to assist and implement a second communication session between the first communication terminal and the second communication terminal comprises one of:
   sending a notification message to the wearable device via Bluetooth, wherein the notification message is sent to the first communication terminal via Bluetooth or a prompt is provided by the wearable device via Bluetooth;
   sending a stranger message to the wearable device, wherein the stranger message is sent to the first communication terminal via Bluetooth by the wearable device via Bluetooth; or
   sending a friend request to the wearable device, wherein the friend request is sent to the first communication terminal by the wearable device via Bluetooth.

8. A communication apparatus for a wearable device, comprising:
   a memory and a processor configured to execute instructions stored in the memory to:
   transmit, via Bluetooth, a broadcast package comprising identity information of a first communication terminal;
   obtain communication information sent by a second communication terminal upon receiving the broadcast package and communicating with the first communication terminal via Bluetooth, wherein the communication information is associated with at least one of a plurality of modes comprising a stranger mode to indicate whether the wearable device is associated with a stranger message and a notification mode to indicate that a notification message has been sent to the wearable device; and
   assist in completing a communication between the first communication terminal and the second communication terminal based on the communication information.

9. The apparatus according to claim 8, wherein the processor is further configured to execute instructions stored in the memory to:
   responsive to determining the communication information is a notification message, send the notification message to the first communication terminal via Bluetooth, or to provide a prompt.

10. The apparatus according to claim 8, wherein the processor is further configured to execute instructions stored in the memory to:
    responsive to determining the communication information is a stranger message, send the stranger message to the first communication terminal via Bluetooth.

11. The apparatus according to claim 8, wherein the processor is further configured to execute instructions stored in the memory to:
  responsive to determining the communication information is a friend request, send the friend request to the first communication terminal.

12. The apparatus according to claim 8, wherein the processor is further configured to execute instructions stored in the memory to:
  bond the wearable device with the first communication device.

13. A device for a communication device, comprising:
  a memory and a processor configured to execute instructions stored in the memory to:
    receive, via Bluetooth, a broadcast package transmitted by a wearable device, the broadcast package comprising identity information of a first communication terminal;
    display the identity information of a first communication terminal; and
    transmit communication information communicated with the first communication terminal by the second communication terminal to the wearable device via Bluetooth, and a communication between the first communication terminal and the second communication terminal is assisted and implemented through the wearable device according to the communication information, wherein the communication information is associated with at least one of a plurality of modes comprising a stranger mode to indicate whether the wearable device is associated with a stranger message.

14. The device according to claim 13, wherein the processor is further configured to execute instructions stored in the memory to:
  send a notification message to the wearable device via Bluetooth, wherein a notification message is sent to the first communication terminal via Bluetooth or a prompt is provided by the wearable device.

15. The device according to claim 13, wherein the processor is further configured to execute instructions stored in the memory to:
  send a stranger message to the wearable device via Bluetooth, wherein the stranger message is sent to the first communication terminal by the wearable device via Bluetooth.

16. The device according to claim 13, wherein the processor is further configured to execute instructions stored in the memory to:
  send a friend request to the wearable device via Bluetooth, wherein the friend request is sent to the first communication terminal by the wearable device via Bluetooth.

* * * * *